T. MOY & R. E. SHILL.
Apparatus for Aerial Navigation.
No. 133,381. Patented Nov. 26, 1872.
5 Sheets--Sheet 5.
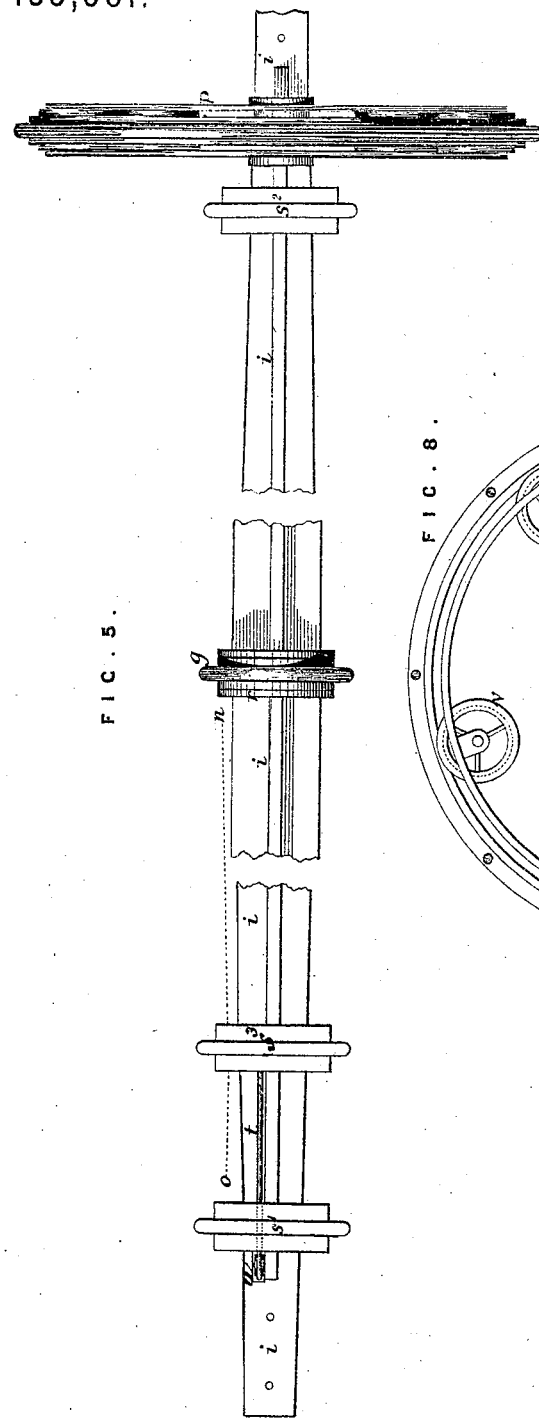
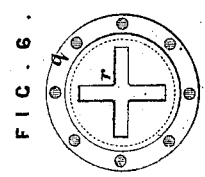
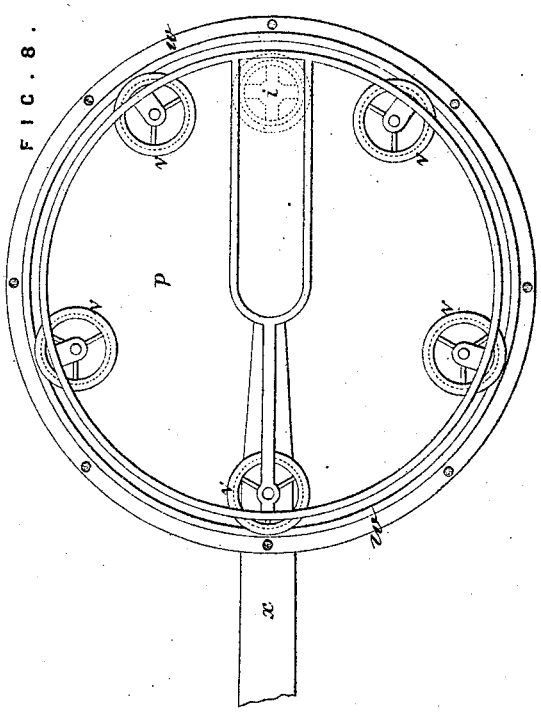
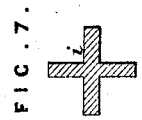

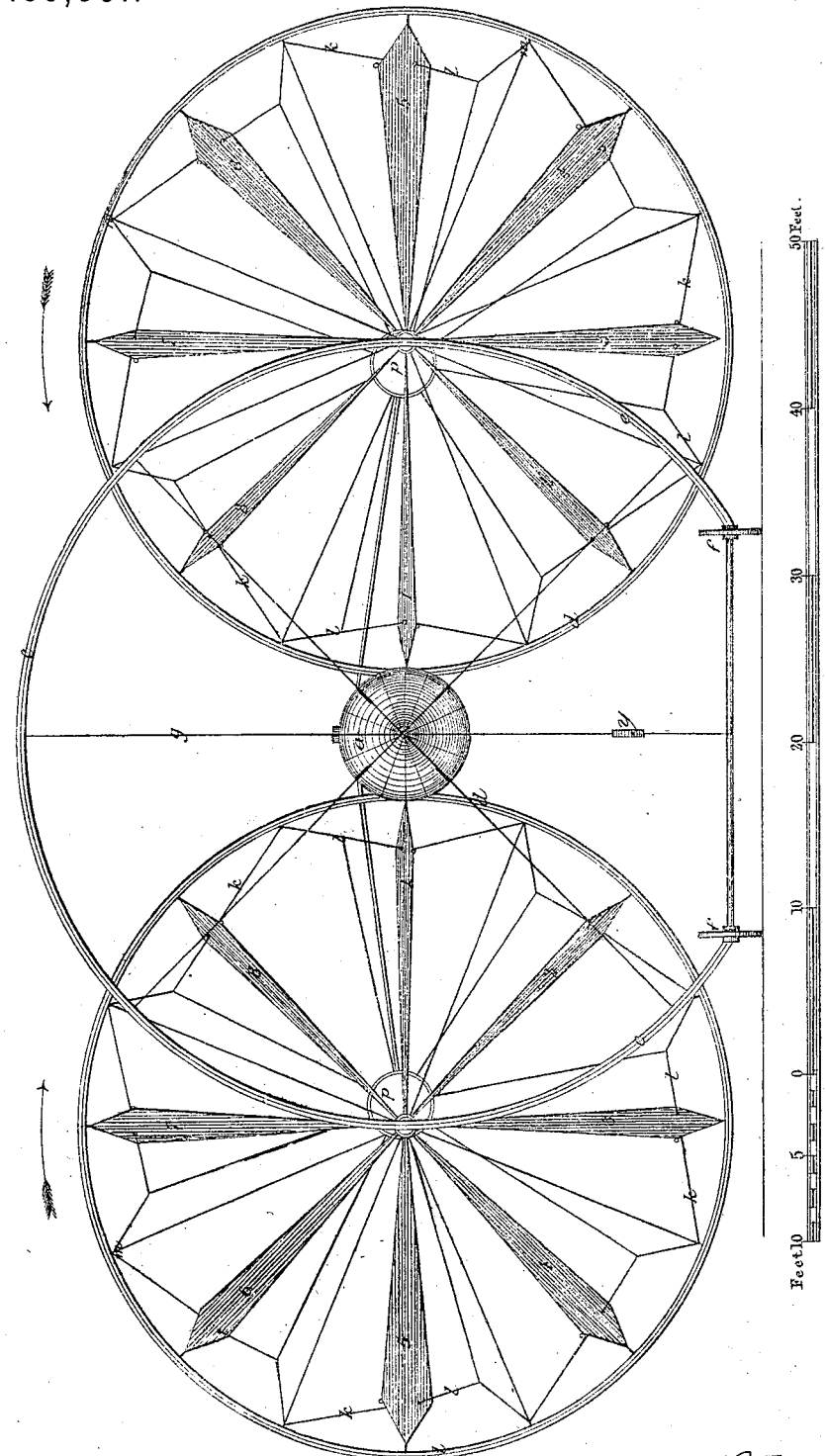

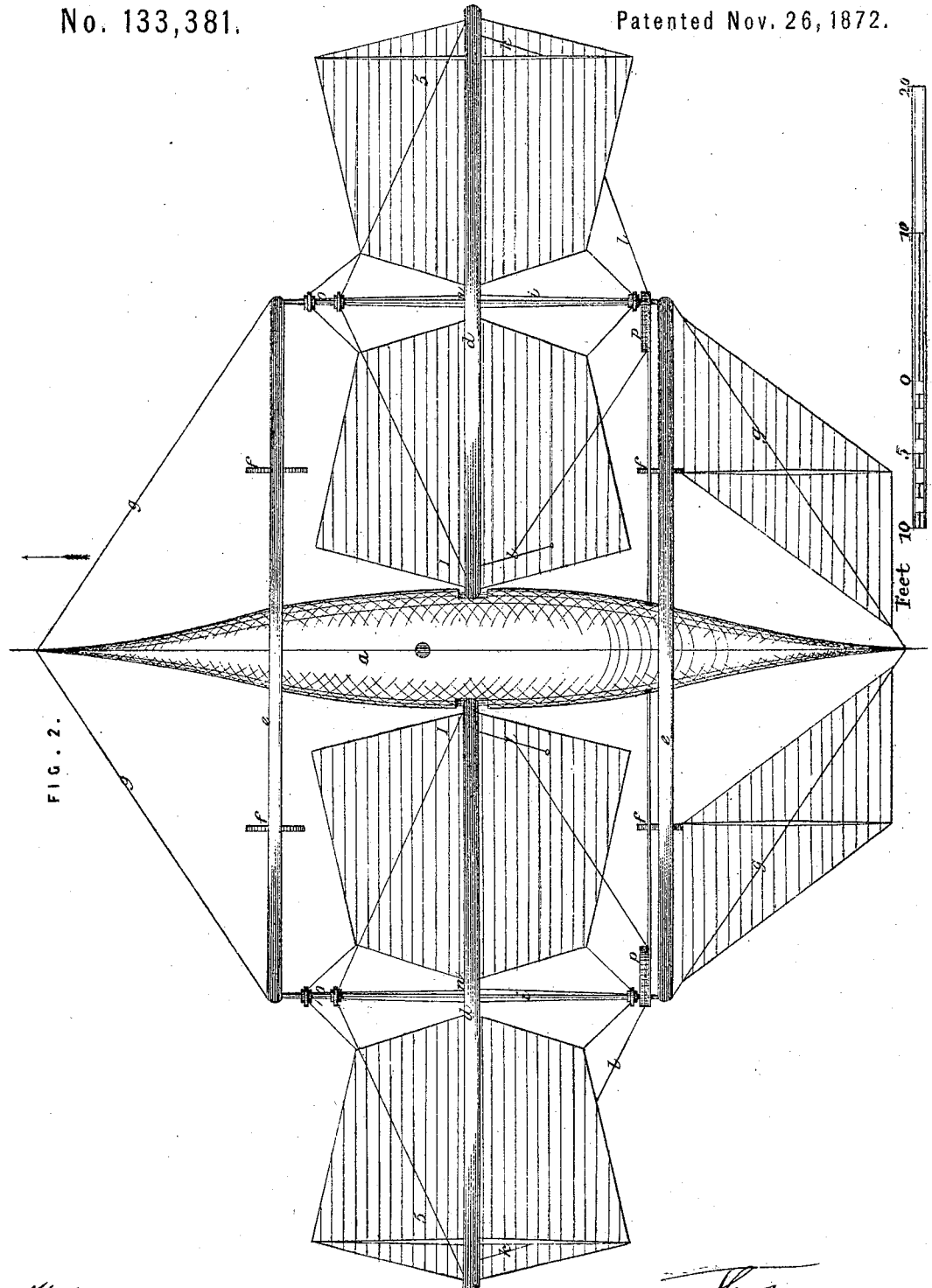

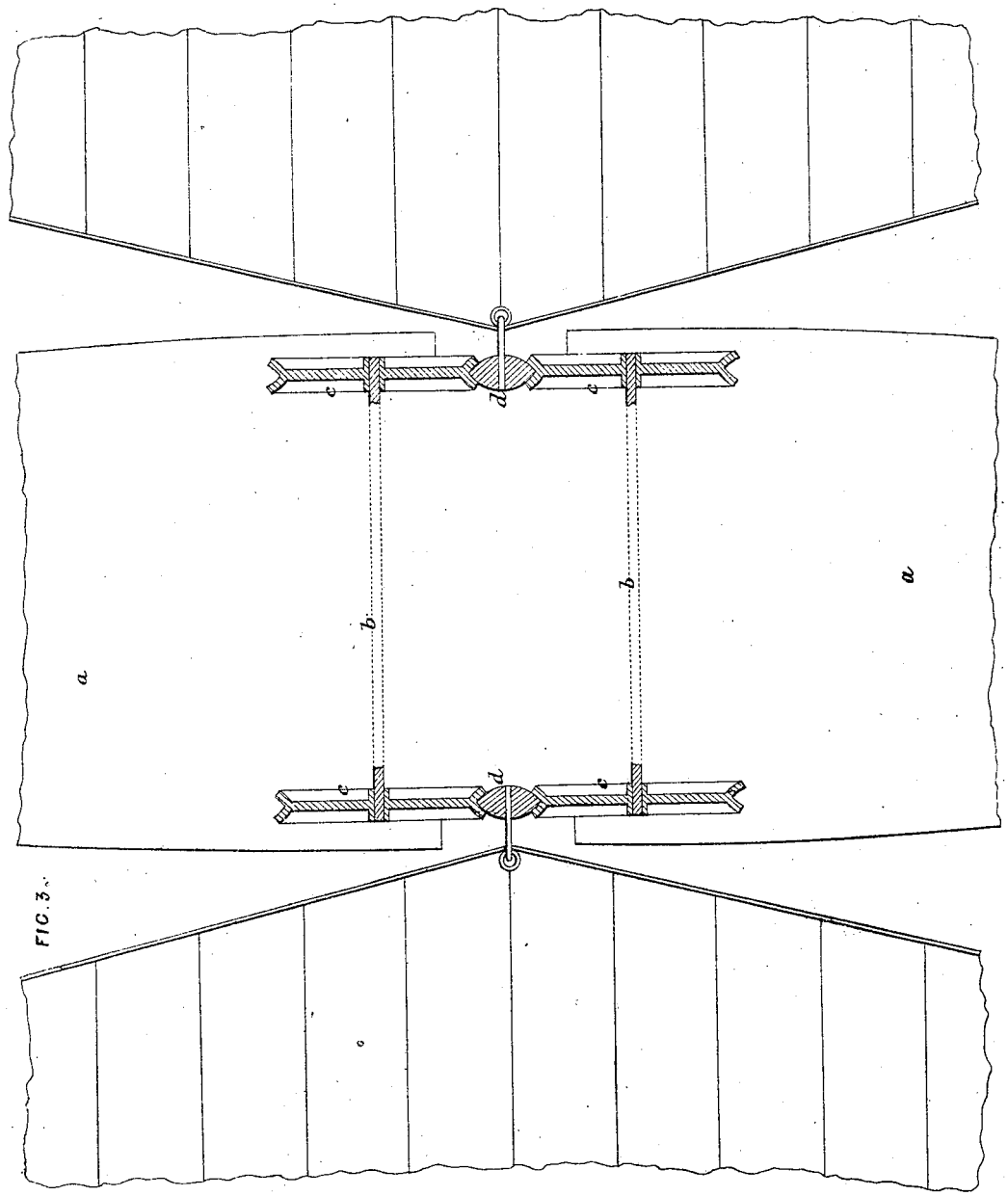

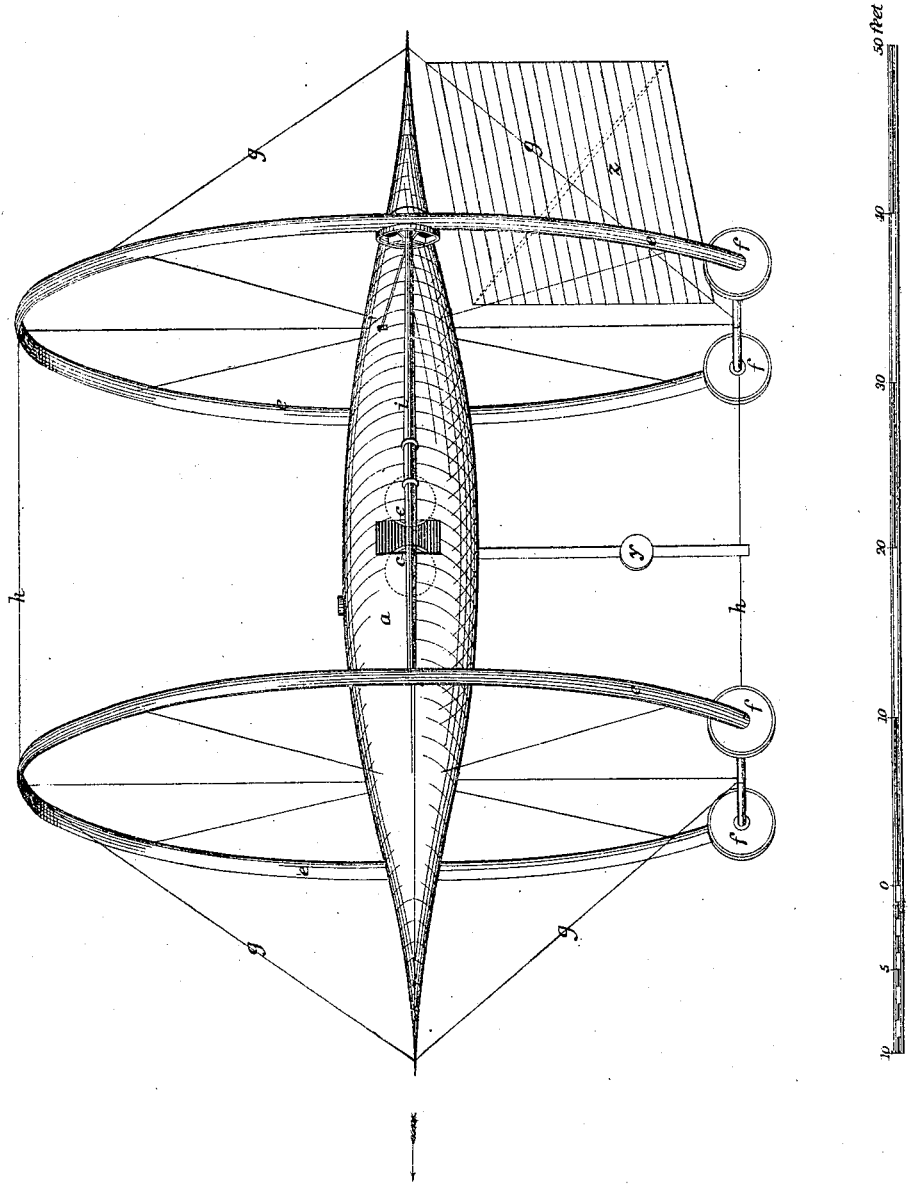

UNITED STATES PATENT OFFICE.

THOMAS MOY, OF LONDON, AND RICHARD EDMUND SHILL, OF MILE END, ENGLAND.

IMPROVEMENT IN APPARATUS FOR AERIAL NAVIGATION.

Specification forming part of Letters Patent No. 133,381, dated November 26, 1872.

*To all whom it may concern:*

Be it known that we, THOMAS MOY, of 1 Clifford's Inn, in the city of London, England, engineering draftsman, and RICHARD EDMUND SHILL, of Mile End, in the county of Middlesex, England, engineer, have invented certain Improvements in Aerial Navigation and in Apparatus for effecting the same, of which the following is a specification:

Our invention of improvements in aerial navigation and in apparatus for effecting the same consists in the adaptation and application to the purpose of aerial navigation of aeroplanes or extended surfaces, mounted and driven in such a manner as to cause such aeroplanes or extended surfaces to take or assume such successive angles of inclination to the line of onward motion that in their downward motion or stroke, whether rotary or reciprocating, they will be caused to act upon the air so as both to raise and propel, while in their upward motion or stroke their under surfaces will be impinged upon by the air with only a lifting tendency. The said aeroplanes are driven by steam or other motive power, a sufficiently light engine for the purpose being mounted on or in a body to which the said aeroplanes are connected in such a manner as to be suitably actuated by the motive power.

The aeroplanes are sometimes combined and arranged so as, in combination with circular hoops, to form two wheels—one on each side of the body—such wheels being driven from the periphery, in which case the aeroplanes, as they successively arrive at a vertical position in each aeroplane-wheel, are in a neutral position as to pressure on their surfaces, while those on the inward or descending and propelling side of the said line, are so inclined as to act on the air with their under surfaces as they revolve, and those on the outer or ascending side are so inclined as to have their under surfaces acted upon by the air. By this combined mode of action of the aeroplanes there is a constant tendency to lift the apparatus while it is being propelled through the air.

The required inclinations are given to the several aeroplanes successively by means of a stationary eccentric to each aeroplane-wheel, on which revolves an eccentric strap, with a connection leading to each aeroplane, so that as the strap is carried round the eccentric by the revolution of the wheel it acts on each aeroplane in succession, and brings it to the required angle of inclination.

If preferred the several aeroplanes may be brought to their required angles of inclination by means of weights, loads, or springs applied to them, or by other suitable means. The aeroplanes are or may be in some cases combined and arranged so as to be worked upon vertical rods rising from and over the body of the machine, and to receive a reciprocating instead of the revolving motion above described. In such cases the aeroplanes are respectively worked at such angles as will cause them, in their downward stroke, to act on the air both with a lifting and propelling effect, and in their upward stroke to be acted upon by the air with a lifting tendency only, similar in effect to the rotary motion of aeroplanes above described; and the angles of inclination of the aeroplanes will be controlled and regulated by means of eccentrics, or by weights, loads, or springs, or other suitable means, so as to obtain thereby effects similar to those of the rotary motion above described. The revolving aeroplanes may also be arranged in front and behind instead of on each side of the body, and driven from the center in opposite directions. Other extended surfaces or aeroplanes may be added to give additional support, and suitable aeroplanes are added for steering. The horizontal position and course of the apparatus may be maintained by a vertical pendulum, connected with horizontal steering aeroplanes, or the said horizontal steering aeroplanes may be moved by manual power, as required.

Having thus stated the nature of the said invention, we will proceed to describe more particularly in what manner the same is to be performed by the aid of the accompanying drawing, in which is represented an aerial machine constructed in one of the modes above referred to.

*Description of the Drawing.*

Figure 1 is a front elevation of the machine. Fig. 2 is a plan or horizontal view of the same, showing only the aeroplanes in a horizontal position, for the sake of clearness. Fig. 3 is horizontal section, showing the mode of driving the aeroplane-wheels by the prime mover; and Fig. 4 is a perspective elevation with the aeroplane-wheels removed.

In all these several figures the same letters of reference indicate corresponding parts.

$a$ is the body, containing the steam-engine or prime mover and cabins for the accommodation of the travelers. This body is elongated in form, circular in end view, or section, and pointed at each end, as shown in Figs. 1, 2, and 4. The engine is placed at or near the center of the body $a$, and turns at a suitable speed one or both of the axles $b\ b$, Fig. 3. Two driving-wheels, $c\ c$, are keyed to each axle, making four wheels altogether, shown in section in Fig. 3. Each wheel is grooved to suit the form of the hoop of the large aeroplane-wheels. If the engine is used to actuate both axles, and consequently the four driving-wheels, then the four driving-wheels must be all of an equal size; but if only one axle and two wheels are so driven, the other two may be of any other convenient size and merely caused to turn by the friction of their rims against the aeroplane-wheels, the object being to confine the inner edges of the aeroplane-wheels, so as to steady them while working. $d\ d$ are the aeroplane-wheels, which are driven at their circumference by the wheels $c\ c$, in the direction shown by the arrows in Fig. 1. The hoops of these wheels may be of the form shown in section in Fig. 3, or may be rectangular, or of any other suitable sectional form, the grooves of the driving-wheels being suitably formed so as to drive the aeroplane-wheels by friction, the aeroplane-hoops entering an opening formed in each side of the body for the purpose. $e\ e$ are two other hoops, placed at convenient distances apart in the manner shown, (more particularly in Fig. 4,) before and behind the aeroplane-wheels, to which hoops the body is attached by wire rods stretched taut, as shown, the lower ends of such frame-hoops being finished with an axle and two wheels. These frame-hoops $e\ e$ form a convenient support for the body, and give a good wheel-base for the machine when on the ground, and also furnish firm and light supports for the axles to the aeroplane-wheels at each end of such axles. The frame-hoops $e\ e$ merely form, with the wire rods, a light and convenient support and frame, and do not themselves revolve. A suitable number of aeroplanes are mounted in the aeroplane-wheels, which aeroplanes may be in the form shown in Fig. 2; but other convenient forms may be used. In Fig. 1, eight aeroplanes are shown to each wheel; but the number may be varied and adapted to the power of the engine or prime mover. The aeroplanes are so mounted as to equalize the strain upon the axle, and thus keep the axle of the aeroplane-wheels central to the hoops. The aeroplanes may be made of canvas or other suitable material. The outer ends of the aeroplanes are connected at one central point to the hoop, so that each aeroplane may be braced to any required angle. Four ground-wheels, $f\ f\ f\ f$, Figs. 1, 2, and 4 are fitted to the frame-hoops $e\ e$, as shown, in order to bear the weight of the machine and run on the ground when starting or alighting. Four stays, of wire, $g\ g$, are fitted from the head and stern of the body $a$ to the hoops $e\ e$ of the frame, to keep them square to the body. The stays at the stern may be used as centers of motion for the rudders. Two other stays ($h\ h$, Fig. 4) connect the tops and bottoms of the frame-hoops $e\ e$, and the axles $i\ i$, Figs. 2 and 4, act as stays as well as axles. By these arrangements a firm frame-work is obtained, upon which the aeroplane-wheels can work efficiently.

The several aeroplanes are caused to take the necessary angles in relation to the line of motion of the machine by the means now to be described. Each aeroplane is stretched partly by the pull or strain from center to periphery, and partly by a spar fitted to it, as shown, such spar being on one side only, or by two spars, one on each side thereof, or the aeroplanes may be made of double material with a spar between. Each spar has two braces attached to it, one being an inelastic brace, and the other an elastic or spring brace. In Fig. 1, $k\ k$ are the spring-braces, and $l\ l$ the controlling-braces. The spring-braces simply draw the spar toward its attachment. The controlling-braces are acted upon in two ways: First, one end is fixed to the after end of the spar or its aeroplane in an opposite direction to the spring-brace, so as to counteract the action of the latter, as required. Secondly, the other end of the controlling-braces is rove through an eye at $m$, through which it passes to a ring on the axle $i$, Figs. 2 and 4. This ring (hereinafter described) is made capable of traveling from $n$ to $o$, (Fig. 2,) and when drawn toward $o$ it is caused to draw and tighten all the controlling-braces, and thereby to decrease the pitch of all the aeroplanes, the spring-braces yielding thereto. Another part of the controlling-brace is acted upon by another cord or brace leading to the eccentric $p$, (also hereinafter described.) This eccentric acts with its maximum force upon the controlling-braces of the aeroplanes at 5 5, (Figs. 1 and 2,) and with its minimum force upon the aeroplanes at 1 1, (Figs. 1 and 2,) and upon the intermediate aeroplanes above and below, in accordance with their respective positions in relation to the eccentric. The result of this combined action of braces and eccentric is such that each aeroplane is successively in its course caused to take a certain angle to the line of motion of the machine, so that in the position numbered 1 (see Fig. 1) the aeroplanes are caused to press on the air downward with their under sides, no pressure being received from the air on their upper sides, while, at the same time, the angle taken is sufficient to produce forward motion, and in this position, (numbered 1,) the pitch of the aeroplane is at its maximum. When the aeroplanes arrive at the position No. 2, the pitch becomes reduced, the pressure of air is still on the under side, and continues until the aeroplanes arrive at the vertical position No. 3, where they are arranged with still decreasing pitch, and in the position No. 3 no pressure is taken on either side, the pitch here being equal to the forward motion at the speed realized. When the aeroplanes successively arrive at the positions 4 and 5 their pitch is decreased by the action of the eccentric and braces, so that the air is allowed to act upon the under side of such aeroplanes, and at the position No. 5 the aeroplanes attain their minimum pitch. From the position No. 5 the pitch of each aeroplane becomes successively increased until it arrives at the position No. 7, receiving during these several changes of position pressure from the air on the under side. At the position No. 7 the pitch becomes neutral (as in the position No. 3,) the aeroplane receiving no pressure from the air on either side. In the position No. 8 the pitch is again increased so that the under side of the aeroplane is caused to press or act on the air until, at the position No. 1, such pressure attains a maximum, exceeding the lifting pressure at the position No. 5. And it is to be understood that this principle of revolving aeroplanes with suitably varying angles, as described, being caused to act on the air so as to give upward and onward motion to the machine by the revolution of the internal half of the revolving aeroplanes, and also caused to receive from the air upward pressure on the external half of the revolving aeroplanes, forms or constitutes the essence of this part of our invention.

$i\ i$, Fig. 5, is a side view of the axle $i\ i$, Figs. 2 and 4, with the rings and the eccentric $p$. $q$ is the central ring, which revolves easily in a collar, $r$. The collar $r$ is fixed on the axle and the ring takes the cords which are fixed to the center of the aeroplanes.

Fig. 6 is a transverse view of the ring and collar. $s^1$ and $s^2$ are two similar collars and rings fixed to the two ends of the axle to stretch the inner ends of the aeroplanes, as required. The collar and ring $s^3$ is capable of being slidden along the axle from $n$ to $o$, (see also Fig. 2,) by means of the cord $t$, which passes round the pulley $u$ and leads to the body $a$.

Fig. 7 is a section of the axle $i$, (of drawn or rolled steel, or other suitable material.)

Fig. 8 is a transverse view of the eccentric $p$. This can be made more or less eccentric by means of the rod $x$, by which it is caused to slide across the after end of the axle, as shown, and thereby vary the pitch and the angle of the aeroplanes, as required. This eccentric consists of a light frame with anti-friction wheels $v\ v$, the eccentric strap $w$ revolving round the said anti-friction wheels, and as it revolves acting upon the controlling-braces, as shown in Fig. 1.

The two horizontal aeroplanes at the hinder part of the machine are connected with the pendulum for the purpose of automatically preserving the horizontal motion of the machine. This is effected by means of cords leading from the pendulum $y$ to the said horizontal steering aeroplanes. If the head of the machine inclines downward, the pendulum moves forward, and by means of the said cords brings the angle of the said steering aeroplanes to a downward inclination, and so continues until the machine again assumes a horizontal course, the contrary effect taking place on the head of the machine inclining upward.

It is preferable, in practice, to trim the machine slightly by the stern, so that the horizontal steering aeroplanes may take some pressure on their under side. Cords are also suitably connected to these aeroplanes, so as to move them by manual power independently of the pendulum. The vertical rudder $z$ is worked only by manual power by means of suitably-attached cords. The pendulum is made to clip the stay-rope $h$ sufficiently to prevent undue oscillation, but leaving it free to act as above described.

Having thus described the nature of the said invention and in what manner the same is to be performed, we hereby declare that what we claim as of our invention is—

1. The construction of aerial machines capable of being lifted and propelled, by the motive power therein contained, by means of revolving aeroplanes, the surfaces of which are successively caused to be inclined to the line of onward motion of the machine in such a manner that the aeroplanes on one side of the neutral line will be caused to act downward on the air with both a raising and propelling effect, while those on the other side thereof will, in their upward course, be impinged upon by the air with only a lifting tendency.

2. The construction of aerial machines with vertically-reciprocating aeroplanes, adapted and worked so as to raise and propel by the downward stroke and to receive on their under side a lifting pressure from the air on their upward stroke.

THO. MOY.
R. E. SHILL.

Witnesses:
WILLIAM SPENCE,
W. A. JACKSON.